United States Patent [19]

Neubauer

[11] 4,280,753
[45] Jul. 28, 1981

[54] FLEXIBLE MIRROR ASSEMBLY

[76] Inventor: Frank W. Neubauer, 867 6th Ave., New York, N.Y. 10001

[21] Appl. No.: 113,951

[22] Filed: Jan. 21, 1980

Related U.S. Application Data

[63] Continuation-in-part of Ser. No. 48,056, Jun. 13, 1979, abandoned.

[51] Int. Cl.³ .............................................. G02B 5/10
[52] U.S. Cl. .................................................... 350/295
[58] Field of Search ............... 350/295, 289; 272/8 M, 272/13

[56] References Cited

U.S. PATENT DOCUMENTS 3,004,472 10/1961 Buxton ................................. 350/295
3,445,157 5/1969 Zitter ................................... 350/295

Primary Examiner—Jon W. Henry
Attorney, Agent, or Firm—Barry Kramer

[57] ABSTRACT

A mirror assembly capable of continuous flexing or undulating is constructed of a flexible sheet material having a reflective surface. Flexing means including opposed roller pairs for engaging the longitudinal edges of the sheet material to impart flexure thereto extends from rotatable chain means disposed along the longitudinal edges of the sheet material. Upon driving the chain means, the flexing means traverses the longitudinal axis of the sheet material causing the sheet material to continuously flex or undulate.

14 Claims, 8 Drawing Figures

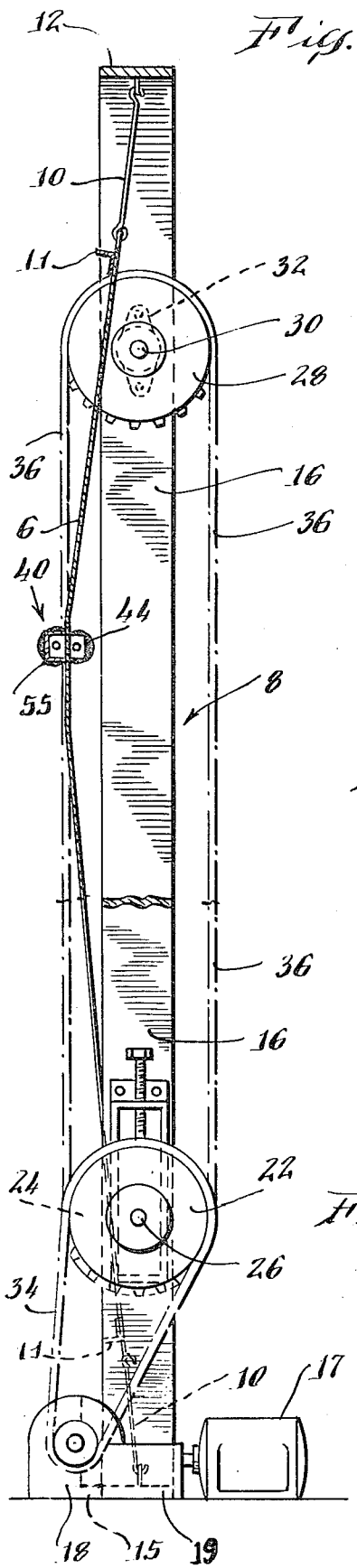
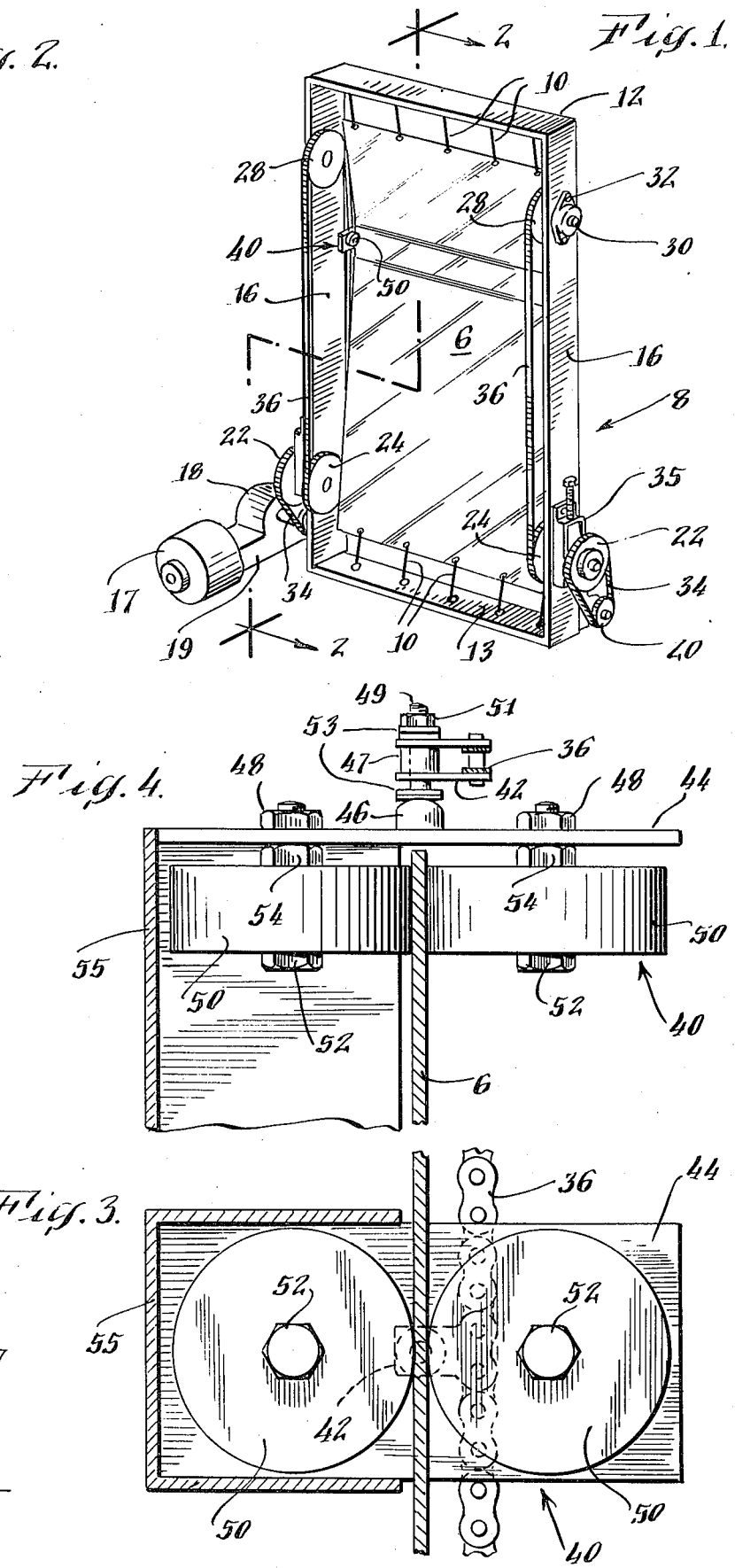

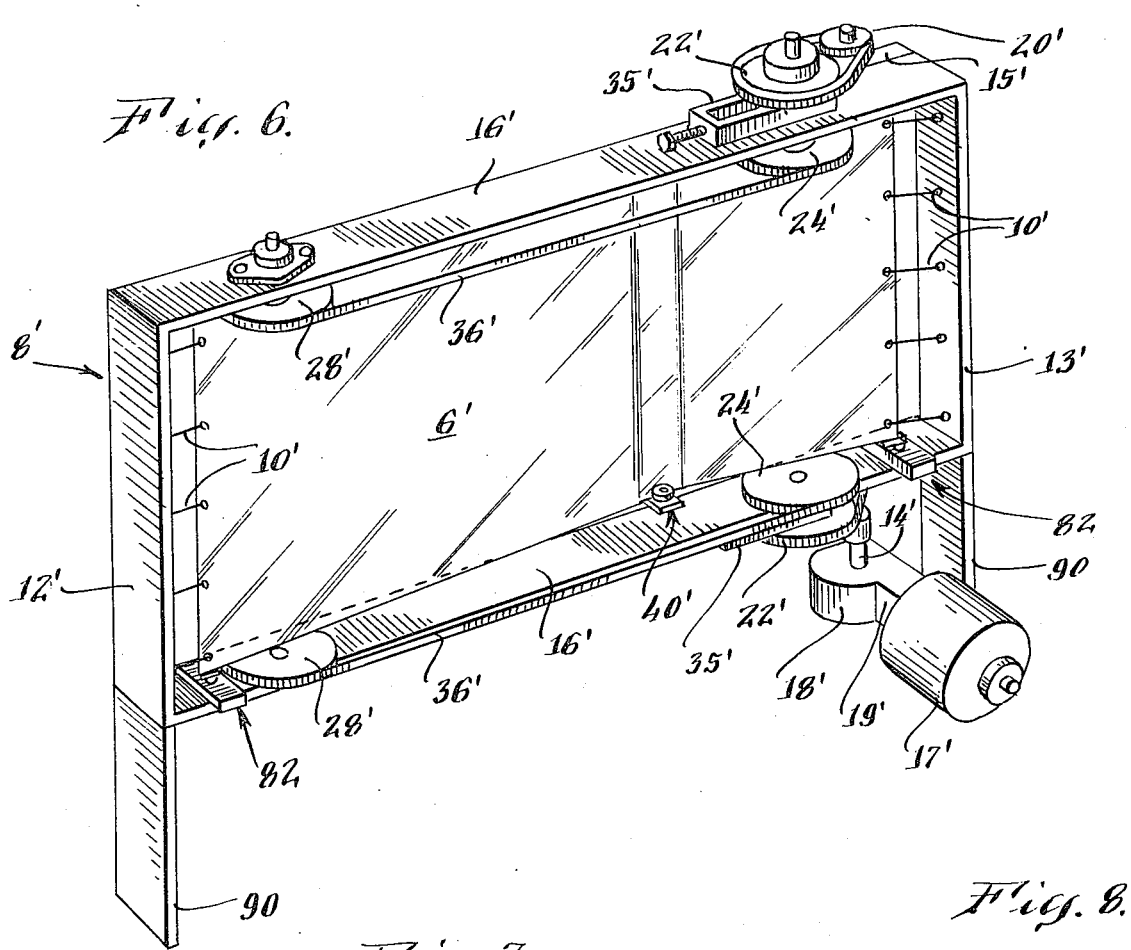
Fig. 6.
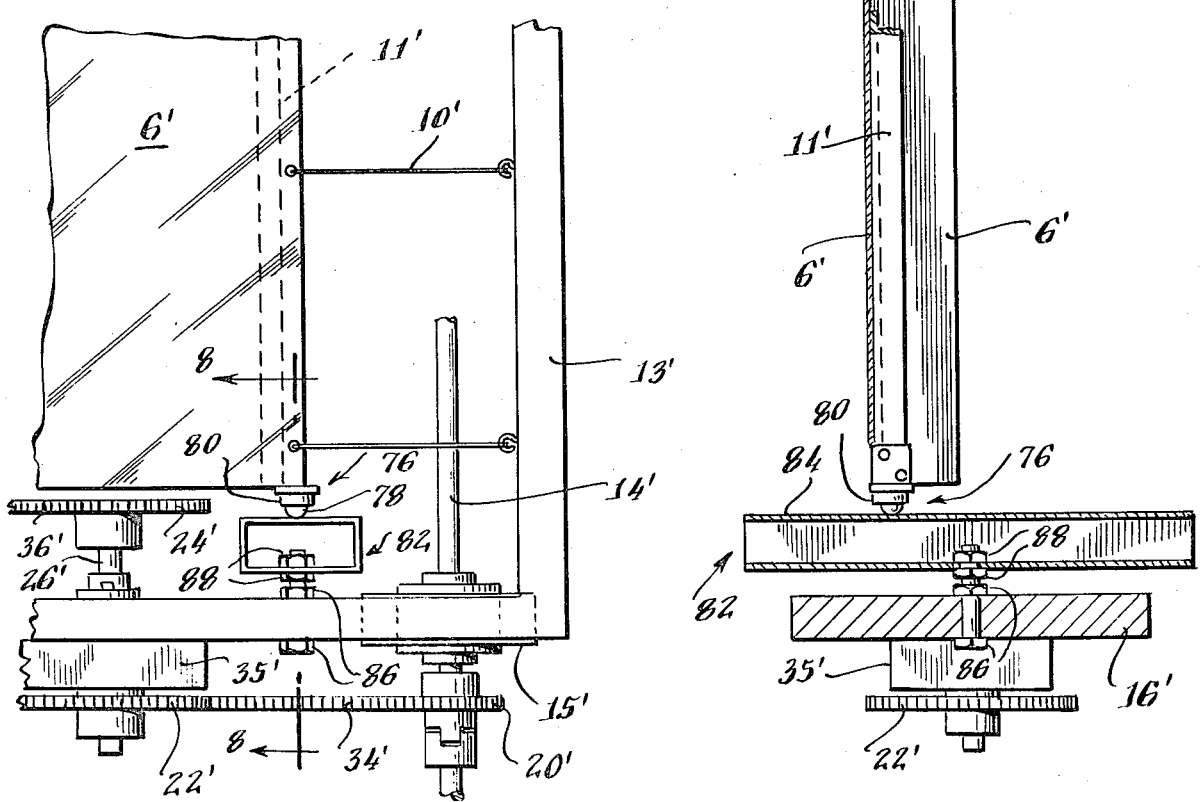
Fig. 7.
Fig. 8.

FLEXIBLE MIRROR ASSEMBLY

This invention is a continuation-in-part of copending application Ser. No. 048,056 filed June 13, 1979 now abandoned.

This invention generally relates to a mirror assembly and deals more particularly with a mirror assembly capable of flexing or undulating so that the surface of the mirror continuously changes configuration.

The mirror assembly of this invention is particularly useful in discotheques, amusement houses, as a solar energy collector, as a toy providing a variety of optical effects, as an optical reflector and in photography or astronomy. In mirrors of this type, the image may appear essentially true or distorted depending upon the curvature of the mirror. U.S. Pat. No. 3,004,472 discloses means for manually distorting a flexible mirror.

The present invention has as its main object to provide a mirror which may be flexed or undulated from a generally planar surface to a concave or convex surface so as to achieve a desired undulating effect. Moreover, the mirror is adapted to be employed in any orientation thereby lending itself to use in horizontal, vertical, or inclined positions.

It is another object of the invention to provide such a mirror which may be undulated on a substantially continuous basis.

These together with other objects and advantages of the invention may be understood by referring to the following detailed specification and the accompanying drawings. In the drawings:

FIG. 1 is a front perspective view of one embodiment of a mirror assembly of the present invention;

FIG. 2 is a side view of the mirror assembly of FIG. 1, parts being broken away for clarity;

FIG. 3 is an enlarged side elevational view of the two wheel mirror engaging unit and attachment member;

FIG. 4 is a plan view of FIG. 3;

FIG. 6 is a perspective view of another embodiment of a mirror assembly of the present invention;

FIG. 7 is a fragmentary front view of the mirror assembly of FIG. 6, taken on a larger scale and showing the mounting of the reflective sheet on the frame; and FIG. 8 is a sectional view taken along the line 8—8 of FIG. 7.

Figure 5:
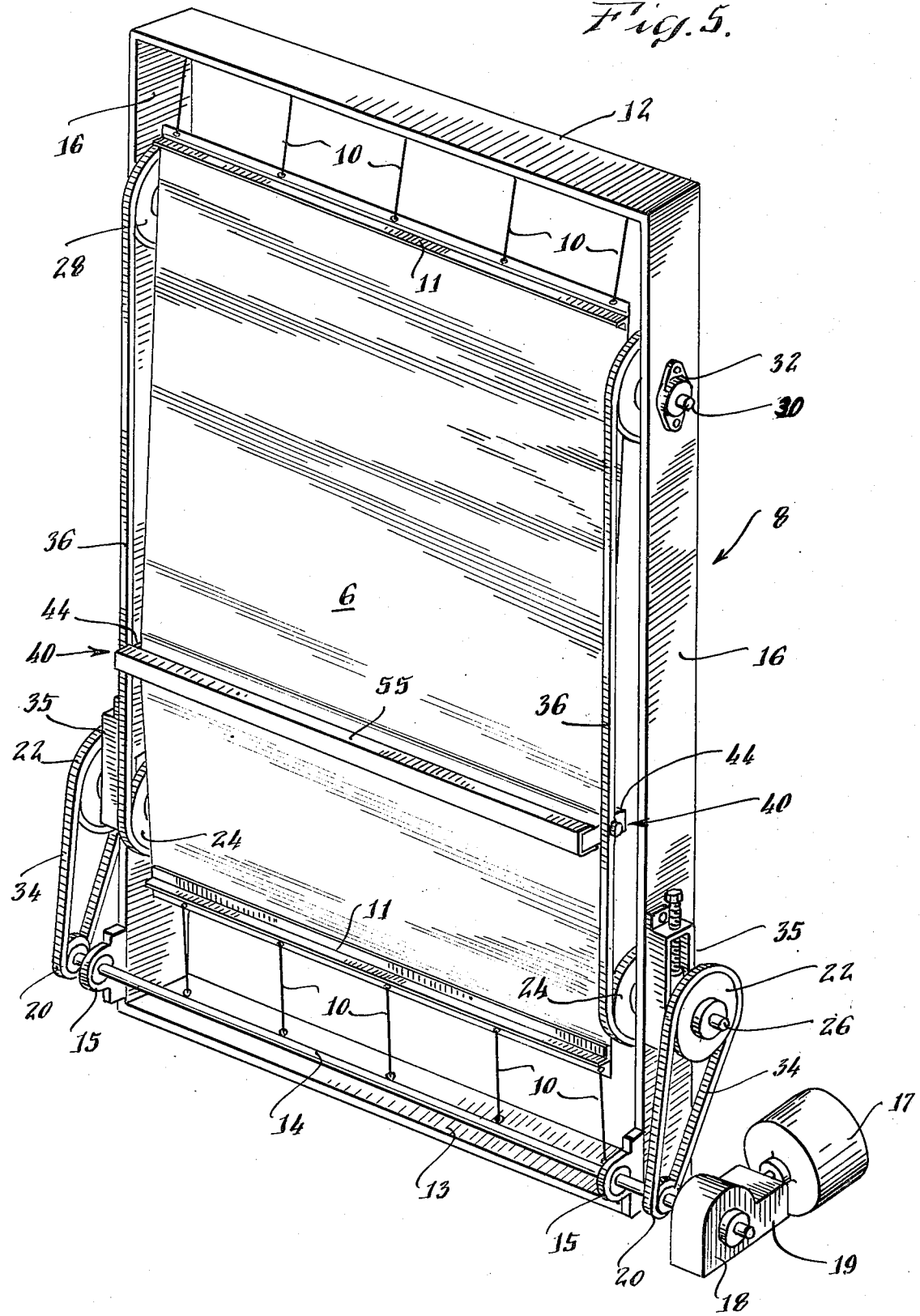
FIG. 5 is a rear perspective view of the mirror assembly of FIG. 1, taken on a larger scale.

In general, the mirror assembly of the present invention is constructed of a flexible sheet material such as a polymeric sheet silvered or otherwise treated on at least one face thereof to provide a reflective surface. The flexible sheet material, as the mirror, is supported or suspended in a rigid frame, generally of rectangular configuration. A pair of roller chains, spaced from each other, are disposed within the frame, each chain being proximate a longitudinal edge of the sheet material and substantially parallel therewith. Flexing means are provided which include a pair of roller units rigidly connected by a reinforcing member. Each of the roller units have a pair of wheels for engaging opposed faces of the sheet material and extend from the roller chains. A suitable motor drives the roller chains and, in turn, the roller units which engage the sheet material. The roller units will move or traverse along the longitudinal edges or rims of the sheet material thereby continuously flexing or undulating the mirror.

Referring first to FIGS. 1–5 wherein like reference numerals designate similar parts throughout, a mirror assembly comprising one embodiment of the present invention includes a rectangularly shaped, flexible sheet material 6, formed from a polymeric sheet such as Mylar or the like, which is silvered or otherwise treated on at least one face thereof so as to be reflective to light. Where desired, however, both faces of the sheet material 6 may be silvered or otherwise provided with a suitable metallic film or other treatment capable of forming a reflective surface thereon. The sheet material 6 is supported or suspended, desirably in a taut position, in a rigid frame, indicated generally by the numeral 8, of substantially rectangular configuration by mounting means comprising a plurality of elastic cords 10. Thus, the top of the sheet material is connected or suspended from the top panel 12 of the frame 8 by means of cords 10, and similarly the bottom of the sheet material is connected to the bottom panel 13 of the frame by cords 10. It will be observed that the sheet material is shorter than the height of the frame such that the sheet material is supported in a substantially taut position. An elongate, rigid reinforcing element 11, herein disclosed as L-shaped angle stock, is secured along the top and bottom edges of the sheet material 6 in order to rigidify such edges and prevent bowing or buckling thereof.

Shaft 14, which is longer than the width of the frame 8, extends above the bottom panel 13 of frame 8 but below the bottom of sheet material 6. Shaft 14, is affixed to frame 8 in a manner which permits rotation of said shaft such as through use of pillow blocks 15 or flanges (not shown) connected to said frame. Pillow blocks 15 are shiftably secured to the side panels 16 for selective longitudinal movement therealong to permit take-up adjustment of chain 34. A variable speed drive includes a constant speed electric motor 17 coupled to a gearhead 18 through a variable speed, reversible drive unit 19, gearhead 18 being in turn coupled with shaft 14. Mounted at each end of the shaft and on the exterior side of the longitudinal panels 16 of the frame are sprockets 20 which are rotated upon rotation of shaft 14. Sprockets 22 and 24 are each mounted on opposed sides of the longitudinal panels 16 of the frame 8 on shafts 26 which are journaled between a pair of opposed flange units 32 on each side of panels 16 to permit rotation of said shafts 26. Panels 16 contain means for increasing the tension on chains 36 as desired such as slots therein or side mounting take-up frames 35. The take-up frames 35 each shiftably mount one of the flanged units 32 thereon and permit positional adjustments to be made. Takeup frames 35 are a commercially available item such as that made by the Browning Manufacturing Division of the Emerson Electric Company and identified by manufacturer's model series number T200. Depending on the nature and construction of the particular take-up frames 35 selected for use, a second pair thereof (not shown) may be mounted on the interior face of the corresponding side panels 16, in respective opposition to the first pair thereof to provide spaced support of the corresponding shafts 26 and prevent twisting or binding of shafts 26. The shafts extend through panels 16 near, but above, the bottom corners of the sheet material 6. Near the top corners of the sheet material but below the top of the same, and on the interior side of the longitudinal panels 16 of the frame 8 are sprockets 28 mounted on shafts 30 which are similarly journaled between a pair of opposed flange units 32 on each side of panels 16 to permit rotation thereof.

Chains 34 are trained about sprockets 20 and 22, and chains 36 are trained about sprockets 24 and 28. In this manner, chains 36 are disposed along and spaced from the longitudinal edges or rims of the sheet material 6 and also are substantially parallel with the longitudinal axis of said sheet material. Thus, motor 17 drives sprockets 20 located near the bottom of the frame 8 and in turn drives sprockets 22 which, in turn drives lower sprockets 24 and upper sprockets 28. Chains 36 are rotated about the sprockets in a manner substantially parallel with the longitudinal edges of the sheet material.

It should be noted here that although the drive means have been described above as employing roller chains, various other drive arrangements are contemplated including various force transmitting gear drives or flexible belts, toothed or otherwise.

Means for flexing the sheet material 6 includes a pair of spaced roller engaging means each generally indicated by the numeral 40, for engaging the sheet material 6 and respectively traversing the opposed longitudinal edges of said sheet material. Each roller engaging means 40 is of identical construction, each being mounted on a carriage assembly herein disclosed as a chain 36. Referring now more particularly to FIGS. 3 and 4 which show the roller engaging means 40 in greater detail, chain 36, which may be a single strand standard roller chain, is provided with one standard straight lug attachment link 42 to which is affixed flat metal plate member 44 by means of a cam follower 46. Shaft 49 of cam follower 46 extends through the oil impregnated bronze bearing 47 which is fixed between the two link plates of each attachment link 42. Cam follower 46 is secured to plate member 44, and shaft 49 has a nut 51 threadably secured to the outer end thereof to limit the outward shifting of attachment link 42 on shaft 49. A pair of washers 53 carried by the shaft 49 on opposite sides of the link 42 are sufficiently spaced apart to allow the shaft 49 and the link 42 to shift relative to each other, transverse to the direction of movement of the chains 36. Cam follower 46 mounts the roller engaging means 40 for rotation about the shaft 49 and, in combination with the oil impregnated bearing 47, both function to reduce wear on the link 42 and shaft 49, by accommodating imperfect meshing between the chains 36 and the sprockets 24 and 28 to assure smooth movement of the roller engaging means 40. It will be observed that the metal plate member 44 is connected to the attachment link 42 so that the planar surface of the plate is substantially parallel with the chain 36 and substantially normal to the sheet material 6. Axles 52 extend inwardly from the plate 44, substantially transverse to the chain 36. An axle 52 is disposed to each side of the chain 36 at substantially equal distance from the cam follower 46. A rubber wheel or roller 50 is mounted on each axle and is secured at the outer end by a pin or nut 48. Spacing elements, such as nuts 54 maintain rollers in spaced relationship with plate 44. The wheels are spaced apart a sufficient distance to accommodate the thickness of the sheet material. Although not required, the axles 52 may be movably disposed within slots in the metal plate 44, if desired, to permit the wheels 50 to be biased toward each other by any suitable means such as a coiled spring (not shown). In this manner, the wheels will more tightly grip the sheet material as they traverse the edges of the sheet material.

The flexing means mentioned above further includes an elongate reinforcing member 55 made of suitable rigid material such as steel or aluminum, and, as best seen in FIG. 3, possesses a U-shaped cross-section. It is to be understood that other geometrical cross-sections may be employed for the reinforcing member 55 which impart the necessary transverse rigidity to the sheet material 6 to prevent the sheet 6 from buckling. Reinforcing member 55 extends transversely across the rear of the sheet of material 6 and has the opposite extremities thereof fixedly secured to the plate members 44, and therefore holds each of the roller engaging means 40 in fixed relationship to each other whereby the roller engaging means 40 are moved by the chains 36 in fixed, synchronized relationship relative to each other.

The sheet material 6 is engaged by the pairs of wheels 50 contained in roller engaging means 40 so as to grip opposed surfaces of the sheet material 6 along the longitudinal edges thereof. The metal plates 44 extend transversely to the sheet material 6, and the roller means 40 are adapted to move in concert with each other as they traverse the longitudinal edges of the sheet material 6. Additional engaging means, (not shown), may be optionally mounted at various points along the length of reinforcing member 55 for engaging central portions of the sheet material 6 to prevent buckling thereof.

In operation, the motor 17 drives sprockets 20, through shaft 14, and in turn sprockets 22 through chains 34. This in turn drives lower sprockets 24 and, through chains 36, upper sprockets 28. As chains 36 are moved or rotated, roller engaging means 40, mounted on each chain, are moved along the longitudinal edges of the sheet material 6. The wheels 50, which grip opposed surfaces of the sheet material 6, ride along the longitudinal edges of the sheet material thereby forcing the sheet to continuously flex or undulate. A protective strip (not shown) of wear resistant material may be applied to the sheet of material 6, along the longitudinal edges thereof in registration with the wheels 50 to prevent the latter from wearing out the sheet of material 6. The roller means 40 are opposite each other and are adapted to move in concert with each other as they traverse the sheet material. As the roller means 40 moves along the edges of the sheet, the sheet 6 (and hence the reflective surface) will, depending on the position of the roller means, be concave or convex; this results in the desired continuous undulating effect with the result that the image or reflection emanating therefrom constantly and controllably changes. When the roller means reach the highest or lowest points of the cycle, the sheet is momentarily returned to being flat. Otherwise, the sheet is either concave or convex.

To elaborate, when the roller means 40 is disposed on that length of the chain 36 which is spaced toward the rear side of the frame 8, the sheet 6 is deformed into a concave configuration. When it is desired to transform the sheet 6 into the convex configuration thereof, motor 17 is energized thereby moving roller means 40 along with the chains 36 toward one of the corresponding sprockets 24 or 28; the roller means 40 ride along the periphery of the associated sprockets 24 or 28 as the chains continue to move until the roller means 40 are disposed on that length of the chains 36 which is spaced forwardly of the frame 8. As the roller engaging means 40 traverse the periphery of sprockets 24 or 28, links 42 rotate with the shafts 49 while the plate members 44, and therefore the wheels 50, are confined to linear movement. Thus, the lateral edges of the sheet 6 being gripped by roller means 40 are alternately shifted forwardly and rearwardly through the frame 8 to produce either outward or inward bowing of the sheet 6 as the roller means 40 travels around the continuous loop defined by clains 36. In this manner, by continuous or periodic operation of motor 17, the contour of the mirror formed by the sheet material 6 can be either continuously or periodically changed.

Attention is now directed to FIGS. 6–8 wherein another embodiment of the invention is shown, in which components identical to those shown in FIGS. 1–5 are designated by like numerals followed by a prime superscript. This alternate mirror assembly is particularly adapted to be operated with the sheet of material 6 disposed vertically with the longitudinal edges thereof extending perpendicular to the influence of gravity (as shown in FIG. 6), as well as in any other position (e.g. horizontal).

A roller assembly in the nature of a castor 76 comprising a ball 78 held rotatably captive within a housing 80 is secured to the opposite extremities of the lower longitudinal edges of the sheet of material 6'; this may be accomplished by securing the housings 80 to the respective opposite ends of the reinforcing elements 11, if desired. Support members 82 having bearing surfaces 84 opposing the balls 78 are secured to the interior side of the lower panel 16' by means of bolt and nut combinations 86 extending through the lower panel 16'. Each of the support members 82 is elongate and extends transverse to the lower panel 16'. The support members 82 are shown in the drawings as being hollow and have a rectangular cross-section. A pair of nuts 88 carried by the bolt and nut combination 86 sandwich one wall of the support member 82 therebetween and allow elevational adjustment of the bearing surface 84 relative to the ball 78.

A pair of extensions 90 may be secured at opposite ends of the frame 8' to support the mirror assembly on its side in spaced relation to a supporting surface therebeneath.

In operation, the balls 78 contact the bearing surfaces 84 and transmit the weight of the sheet of material 6' to the frame 8' through the support members 82. As the sheet of material 6' undulates and shifts relative to the frame 8', the castors 76 move along the bearing surfaces 84 transverse and longitudinally relative to the longitudinal axes of the panels 16'. In this manner, the sheet of material 6' is prevented from sagging or buckling under its own weight and essentially perfect geometric flexing of the sheet of material 6' is maintained.

The foregoing detailed description has been given for clearness of understanding only, and no unnecessary limitations should be understood therefrom, as modifications will be obvious to those skilled in the art.

Having thus described the invention, what is claimed as new and desired to be secured by Letters Patent is:

1. A mirror assembly, comprising:
    a sheet of flexible material having surface areas adapted to reflect light;
    a rigid frame adapted to support said sheet of flexible material;
    means shiftably mounted for flexing said sheet along a path extending between one pair of opposite edges of said sheet; and
    means operably coupled with said flexing means for driving said last named means to traverse said sheet whereby to cause said sheet to undulate.

2. A mirror assembly according to claim 1 wherein said sheet is elongate and said flexing means comprises two roller units each contacting an opposite edge of said sheet in said one pair thereof, each of said roller units comprising a pair of wheels having axes transversely disposed relative to the longitudinal axis of said sheet whereby each wheel of each pair thereof engages an opposed surface of said sheet.

3. A mirror assembly according to claim 1 wherein said driving means includes sprocket means mounted for rotation on said frame near the opposite ends of said sheet material, roller chains trained about said sprocket means, said flexing means extending from said roller chains, and means for driving said roller chains.

4. A mirror assembly according to claim 3 including a plate member extending from each of said roller chains so as to be substantially normal to said one pair of opposite edges of said sheet, and a pair of wheels extending from said plate member so that each wheel of the pair thereof engages an opposed surface of said sheet.

5. A mirror assembly according to claim 1 wherein said sheet comprises a polymeric sheet having a metallic film on at least one surface thereof.

6. A mirror assembly according to claim 1 wherein said sheet is provided with a pair of spaced apart strips of wear-resistant material applied along opposite edges in said one pair thereof of at least one face thereof in registration with said flexing means.

7. A mirror assembly according to claim 1 wherein said flexing means comprises:
    first and second spaced apart, shiftably mounted means for respectively engaging said opposite edges in said one pair thereof of said sheet, and
    means secured to each of said first and second engaging means for holding said first engaging means in fixed relationship relative to said second engaging means.

8. A mirror assembly according to claim 7 wherein each of said first and second engaging means includes a roller unit comprising a pair of roller members adapted to engage opposite faces of said sheet along said opposite edges of said one pair thereof of said sheet.

9. A mirror assembly according to claim 8 wherein:
    said drive means includes a carriage assembly shiftably mounted on said frame and operably coupled with each of said roller units for guiding said roller units for movement in a path along said opposite edges in said one pair thereof of said sheet,
    each of said roller units including a shaft slidably confined in a sleeve member for movement transverse to said path of movement of each of said roller units along said one pair opposite edges of said sheet.

10. A mirror assembly according to claim 7, wherein said holding means comprises a rigid, elongate reinforcing member extending between said first and second engaging means and fixedly attached to each of said last named means.

11. A mirror assembly according to claim 1, including means for mounting said sheet on said frame, comprising:
    a rigid reinforcing element secured along each edge of another pair of opposite edges of said sheet, and
    elastic holding means coupling at least portions of the perimeter of said sheet with said frame.

12. A mirror assembly according to claim 1, including:
    a pair of spaced apart bearing surfaces on said frame adjacent on of the edges of said sheet in said one pair of edges thereof, and a pair of roller assemblies respectively associated with said pair of bearing surfaces and adapted to contact the latter to transmit the weight of said sheet to said pair of bearing surfaces, said pair of roller assemblies being respectively mounted on opposite extremities of said one edge of said sheet in registration with said pair of bearing surfaces.

13. A mirror assembly according to claim 1, wherein said drive means comprises:

a motor member having an output shaft, and a drive transmission assembly operably coupled between said output shaft of said motor member and said flexing means.

14. A mirror assembly comprising:

(a) a flexible mirror which is reflective to light on at least one surface thereof;
(b) a rigid frame supporting said flexible mirror;
(c) roller chains mounted on said frame and extending along each longitudinal edge of said flexible mirror and substantially parallel therewith;
(d) roller unit means extending from each of said roller chains and each having a pair of wheels with axes transversely disposed relative to the longitudinal axis of said flexible mirror for rotatably engaging said flexible mirror along its longitudinal edges; and
(e) means for driving said roller chains whereby said roller units traverse along the longitudinal edges of said flexible mirror so as to cause said flexible mirror to undulate.

* * * * *

UNITED STATES PATENT AND TRADEMARK OFFICE
CERTIFICATE OF CORRECTION

PATENT NO. : 4,280,753
DATED : July 28, 1981
INVENTOR(S) : Frank W. Neubauer

It is certified that error appears in the above—identified patent and that said Letters Patent is hereby corrected as shown below:

Column 6, line 67, "on" should read --one--.

Signed and Sealed this

Twentieth Day of October 1981

[SEAL]

Attest:

GERALD J. MOSSINGHOFF

Attesting Officer     Commissioner of Patents and Trademarks